United States Patent [19]

O'Connor

[11] 4,188,505

[45] Feb. 12, 1980

[54] MODULAR JACK CONVERTER

[75] Inventor: Robert J. O'Connor, Greenfield, Ind.

[73] Assignee: Bell Telephone Laboratories, Incorporated, Murray Hill, N.J.

[21] Appl. No.: 949,410

[22] Filed: Oct. 10, 1978

[51] Int. Cl.[2] .............. H04M 1/00

[52] U.S. Cl. .............. 179/1 PC; 179/91 R; 339/258 A

[58] Field of Search .............. 179/91 R, 91 A, 1 PC, 179/98; 339/8 PB, 8 PS, 68, 84, 95 R, 95 A, 100, 136 C, 252 R, 255 RT, 258 R, 258 A, 258 P, 258 RR, 269

[56] References Cited

U.S. PATENT DOCUMENTS

| | | | |
|---|---|---|---|
| 1,359,585 | 11/1920 | Fitzgerald | 339/258 A |
| 3,155,808 | 11/1964 | Wiley | 339/258 A |
| 3,510,831 | 5/1970 | De Vito | 339/258 R |
| 3,668,324 | 6/1972 | Firestone | 179/1 PC |
| 4,071,696 | 1/1978 | Anderson | 179/91 R |

*Primary Examiner*—Gerald Brigance

*Attorney, Agent, or Firm*—Sylvia J. Chin; Harry L. Newman

[57] ABSTRACT

An improved electrical jack assembly (20) for converting to modular use a telephone terminal block (10) with screw terminals (11) is disclosed. Leads (32) in the jack assembly connect at one end (31) to contact elements (27) in a modular jack (22) affixed to an assembly housing (21) and at the other end (33) to screw-engaging connectors (34), each of which comprises a body (37) of conductive material with a base (40) and a plurality of resilient elongate members (42) extended therefrom. The free end portions (45) of the members (42) include sharp-pointed contact tips (47). The free end portions (45) also tend toward one another to define with their tips (47) an opening (48) for snugly receiving a head (12) of an assigned screw terminal (11), where the tips (47) can bear against the screw head (12) to effect reliable electrical and mechanical connection.

12 Claims, 5 Drawing Figures

FIG. 1
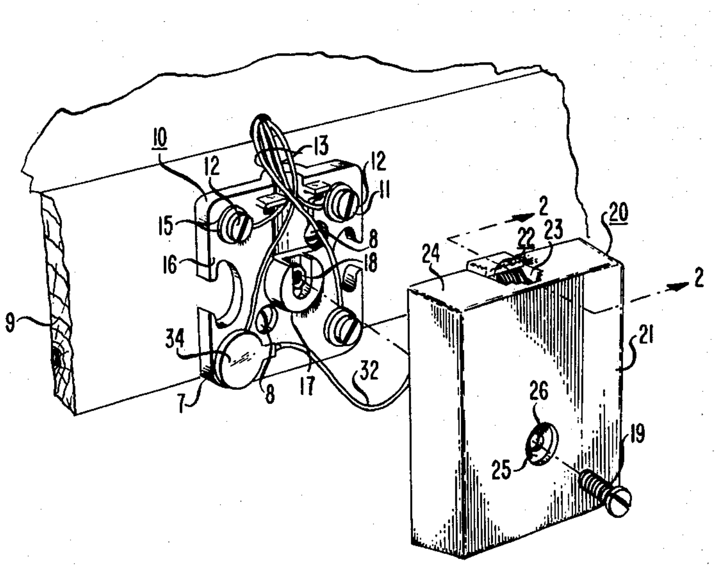
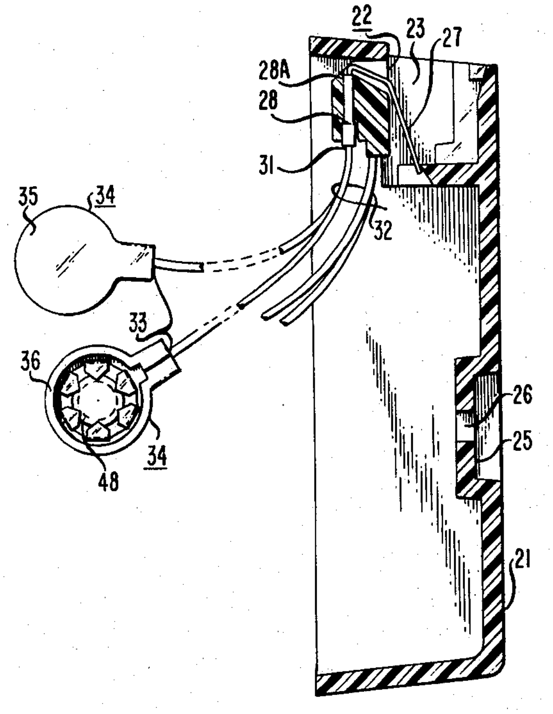
FIG. 2

MODULAR JACK CONVERTER

TECHNICAL FIELD

This invention relates to connectors and more particularly to jack assemblies which can convert conventional telephone terminal blocks to modular jacks for use with modular telephone plugs.

BACKGROUND OF THE INVENTION

Each residence set up for phone service usually has telephone distribution wires coming in from a central office or the like with the distribution wires terminating under screw terminals in a conventional telephone terminal block. Typically, wires in a telephone cord from a station set or the like are spade lugged and connect directly to the screw terminals in the block. A protective insulative cover secures over the block after the connections are made. Each time connection or disconnection of a station set is desirable, the cover must be removed to connect or disconnect the telephone cord wires.

A growing number of telephones, and especially customer-owned telephones, are manufactured with cords having modular plugs. Hence, increasingly, terminal blocks must be converted to modular jacks with modular jack converting assemblies. Also, increasingly, customers are installing their own station sets.

One modular jack converter which is being used includes a modular jack affixed to a converter housing similar to the conventional cover. Leads in the converter housing connect at one end to contacts in the modular jack and at the other end to the screw terminals in the terminal block via spade-lugged ends. This prior art converter requires a customer-installer to unscrew the screw terminals to secure the converter leads and involves physical tampering of already-made connections. This can cause accidental dislodging of the incoming distribution wires and lead to confusion especially to those unfamiliar with terminal blocks. Also, tampering with the screw terminals can expose a customer-installer to potential shock hazards. Hence, there is need for modular jack converting assemblies that are easier for customers to install.

Another modular jack converter which has been developed for converting a terminal block and is easy to install is disclosed in Anderson U.S. Pat. No. 4,071,696. In Anderson, helical spring contacts in the jack are positioned in a predetermined arrangement and physically contact the assigned screw terminals upon attachment of the jack converter to the terminal block.

However, terminal blocks found in customers' residences vary in age and condition. In some terminal blocks, the screw terminals are corroded or otherwise covered with contaminating particles so that mere physical contact does not result in reliable electrical connection. In addition, the incoming distribution wires, which have been assigned a particular colored insulation, according to a predetermined arrangement, are not always connected to their normally designated screw terminals or to the proper connections at the central office.

Hence, one object of this invention is to develop a modular jack converting assembly which minimizes the effect of the corroded or contaminated surfaces of screw terminals on electrical connection and which includes screw-engaging connectors capable of penetrating most corroded or otherwise contaminated screw terminal surfaces.

Another object is that the modular jack converting assembly minimizes physical tampering on the part of a customer-installer with the screw terminals of the terminal block to reduce confusion and to prevent potential shock hazards.

A further object of this invention is that the modular jack converting assembly is quick and easy to install and inexpensive.

SUMMARY OF THE INVENTION

In accordance with the broadest aspect of this inventive modular jack converter, contact elements in the modular jack are connected by leads to screw-engaging electrical connectors which are capable of penetrating the surfaces of a screw terminal to effect reliable electrical connection. Advantageously, the connectors also fasten securely onto the heads of the screw terminals in the terminal block.

In the illustrative embodiment, each screw-engaging connector includes a contact body which is made of electrically conductive material. The contact body comprises a substantially circular plate-like base and a plurality of resilient elongate members extending vertically from the outer perimeter of the base. A portion near the free end of each elongate member is bent inward toward the other members and slightly downward toward the center of the base. The free ends of the elongate members taper to form sharp-pointed contact tips. The tips define a cavity opening for fastening onto a screw head. The cavity opening is smaller in cross-section than any screw heads encountered so that the tips can bear against a screw head sufficiently to firmly grip and penetrate the surface of the screw head. Also, the contact body includes a coined elongate base portion which extends from the circular base and which contains crimping flanges for electrically terminating its assigned lead.

In accordance with a further aspect of this invention, each connector includes a housing of dielectric material which molds around the contact body to substantially electrically isolate the contact body from handling during installation. A person need only grip the connector housing and push the connector into place onto a respective screw head. The connector housing also includes in particular an extended molded base portion with side walls which fold over to encompass the crimped flanges of the contact body and its terminated lead to provide additional strain relief.

The housing of each connector is also color-coded to match the color of the incoming telephone distribution wire and the screw terminal to which the connector is to be connected.

The invention and its further objects, features, and advantages will be readily discerned from a reading of the description to follow of an illustrative embodiment.

BRIEF DESCRIPTION OF THE DRAWING

FIG. 1 depicts in exploded view the inventive modular jack converter and a conventional telephone block terminal;

FIG. 2 is a sectional side view of the jack converter taken substantially along line 2—2 in FIG. 1 with two connectors shown;

DETAILED DESCRIPTION OF THE ILLUSTRATIVE EMBODIMENT

Figure 3:
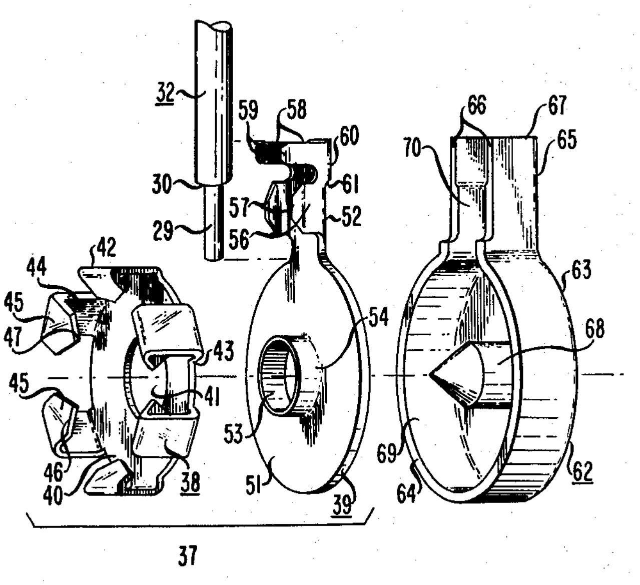
FIG. 3 illustrates in perspective view the components before assembly into the screw-engaging connector made in accordance with this invention.

Depicted in FIG. 1 in perspective view is a conventional telephone terminal block 10 mounted via screws 8 onto a baseboard 9 of a wall in a phone customer's residence or office. The terminal block 10 comprises a plurality of conductive screw terminals 11 having screw heads 12. Each screw terminal 11 terminates a corresponding incoming telephone distribution wire 13 from the telephone central office or the like by sandwiching tightly its insulation-stripped conductor under the screw head 12 and metal washers 15 against a front wall 16 of the terminal block 10. The block 10 includes a portion 17 protruding from the front wall in which is contained a threaded aperture 18 for receiving a screw 19.

Also, depicted in FIG. 1 is a modular jack converting assembly 20 which is largely rectangular in configuration. The jack assembly 20 comprises a housing 21 made of a dielectric material and a modular jack 22 affixed thereto for receiving a modular telephone plug. One such modular jack is disclosed in U.S. Pat. No. 3,850,497, which is also assigned to the assignee of the present application. In FIG. 1 the modular jack 22 is mounted so a plug-receiving cavity 23 appears on a wall 24 at the top of the housing 21. In actual installations, however, the jack assembly 20 is mounted with the wall 24 containing the plug-receiving cavity 23 positioned as a sidewall.

The housing 21 includes a recessed portion 25 having an opening 26 in alignment with the threaded aperture 18 of terminal block 10. Screw 19 threads through opening 26 to secure the jack assembly 20 to the terminal block 10.

Shown in greater detail and in side view in FIG. 2, the modular jack 22 comprises resilient wire spring contact elements 27 (only one shown), each of which is connected to a first end 31 of one of the leads 32 in the assembly 20 via a crimp-type connector 28. The ends 31 and crimp connectors 28 are mounted in orifices 28A (one shown) in the modular jack 22. The orifices 28A are staggered in the modular jack 22 for a more compact fit. The second end 33 of each lead 32 is connected to a screw-engaging connector 34. Only two of the connectors 34, one with the top 35 depicted and the other connector 34 with the bottom 36 depicted, are illustrated in FIG. 2. In FIG. 1 one connector 34 is shown fastened onto its respective screw head 12.

Figure 4:
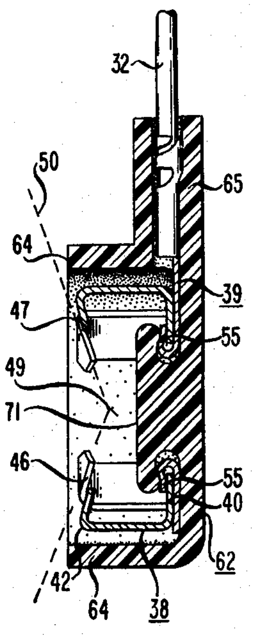
FIG. 4 depicts in partial cross-sectional view the screw-engaging connector when assembled.

Referring to FIGS. 3 and 4, each connector 34 comprises a conductive contact body 37 and a dielectric connector housing 62 in the illustrative embodiment. The conductive contact body 37 is two-pieced and comprises a coined first contact component 38 and a coined second contact component 39, both made of electrically conductive material such as heat treated or stainless steel.

The first contact component 38 includes a substantially circular planar base 40 with a hole 41 in the center. A plurality of elongate members 42 extend from the base 40 along its outer perimeter 43. Each elongate member 42 comprises an upright portion 44 and an end portion 45, which is bent inward toward the other members 42. Each end portion 45 has a tapered section 46 forming a sharp-pointed contact tip 47. The plurality of sharp-pointed contact tips 47, which are evenly spaced, define an opening, denoted by dotted line 48 in FIG. 2, to a cavity 49 defined by the base 40 and elongate members 42. The opening 48 is smaller in cross section than the cross section of any screw head the contact body 37 will encounter.

Advantageously, each tip 47 has a tip 47 located diametrically opposite to counterbalance the force from each other. The counterbalancing permits a higher spring force for each tip 47 when bearing against a respective screw head 12 upon connector fastening. Also, the end portions 45 are bent slightly toward the base 40 to define a depression denoted by lines 50 for centering and directing each screw head 12 into opening 48 as depicted in FIG. 4 of those end portions 45 shown. In one embodiment, the end portions 45 are bent 45 degrees with respect to the upright portions 44.

The second contact component 39 comprises a plate of conductive material shaped into a circular base 51 and an elongate base portion 52 extending from the circular base 51. The base 51 includes an aperture 53 defined by a protruding circular sleeve 54 sized to fit into hole 41 of the first contact component 38. After being placed through hole 41, the sleeve 54 is expanded into a rivet-type edge 55 to fit over the base 40 to secure the two components 38 and 39 in reliable mechanical and electrical connection as shown in FIG. 4.

The elongate base portion 52 is coined to form a first set of flanges 56 and a second set of flanges 58 extending perpendicularly from the longitudinal edges 60 of the elongate base portion 52. The flanges 56, 58 taper in thickness along their top portions 57, 59 respectively to ease crimping onto the second end of the assigned lead 32. The elongate base portion 52 has an undulation 61 so that the two sets of flanges 56, 58 are offset. The flanges 56 terminate the conductive core 29 of the lead 32 while the flanges 58 crimp down to mechanically secure the entire lead 32 with core 29 and its surrounding insulative covering 30.

Instead of a contact body 37 that is assembled by riveting two pieces together, it is apparent that contact body 37 can be made with a unitary piece of conductive material, whereby the elongate base portion 52 with the crimping flanges for lead 32 can extend directly from a base similar to base 40.

The housing 62, made of dielectric plastic material, is panshaped and comprises a circular base 63 with a substantially circular wall 64 extending perpendicularly therefrom to define a circular recess 69, and a handle-like base portion 65 with walls 66 extending perpendicularly from either longitudinal edge 67 to define an elongate recess 70. The base 63 also includes an upright centering stud 68 which fits through the aperture 53 of the second contact component 39.

After the contact components 38 and 39 have been assembled and the respective lead 32 has been terminated thereto, the contact body 37 is placed into the recesses 69 and 70 of the connector housing 62. The stud 68 centers the assembled bases 40 and 51 so that the circular wall 64 loosely fits around the elongate members 42. This loose fit allows the elongate members 42 to deflect as the connector 34 fastens onto a screw head 12. Advantageously, the circular wall 64 is sized to limit deflection of the elongate members 42 to within their elastic limits.

To secure the connector housing 62, the stud 68 is heated to melt down to expand over the rivet-type edge 55 of the sleeve 54, while the walls 66 are deformed under heat to fold over and enclose the crimped flanges 56, 58 surrounding a lead 32. Advantageously, the folded over walls 66 reinforce the crimped terminations contained therein by providing strain relief. The expanded stud has a flattened portion 71 for limiting insertion of the screw head 12 into cavity 49.

In accordance with a further aspect of this invention, the connector housings 62 to the connectors 34 are made of colored dielectric material, each of which is color-coded to match the color designated its assigned screw terminal 11 as determinable by the insulation color of its assigned terminated distribution wire 13 or by notations on the block 10 (not shown). Hence, each connector 34 would be red, yellow, green, or black. The respective leads 32 are also color-coded.

Figure 5:
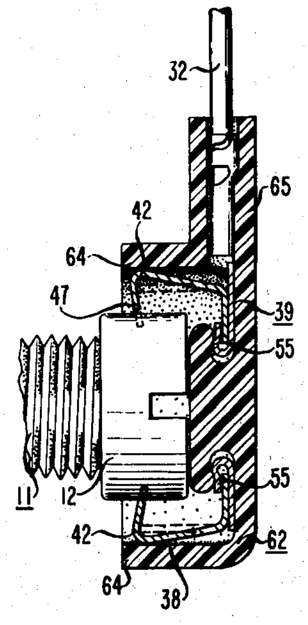
FIG. 5 depicts in partial cross-sectional view the FIG. 4 connector fastened onto a screw head.

To fasten a connector 34, the connector bottom 36, with the sharp-pointed contact tips 47, is first brought against its assigned screw head 12. The customer-installer then presses against the connector top 35 to push the connector 34 onto the respective screw head 12 as shown in FIG. 1. The elongate members 42 are sufficiently resilient to yield to receive the assigned screw head 12 in the opening 48 and cavity 49. However, in accordance with this invention, the tips 47 bear sufficient forces against the sides of the screw heads to scrape along and penetrate even the corroded or contaminated surfaces to effect a reliable electrical connection as depicted in FIG. 5. A plurality of contact points increases the chances of reliable electrical connection. Advantageously, the tips 47 fit tightly about screw 11 to mechanically secure the connector 34.

The connector 34 is easy to fasten and minimizes physical tampering on the part of the customer-installer with the conductive screw terminal 11 or contact body 37.

As for the old telephone cord wires (not shown) already terminated at the screw terminals 11, the customer-installer simply severs these wires at a point away from their spade-lugged ends before he fastens the connectors 34.

Referring to FIG. 1, after all the connectors 34 have been fastened, the customer-installer mounts the housing 21 over the terminal block 10 and secures the modular jack converting assembly 20 with screw 19. It should be pointed out that the connectors 34 should be rotated so that the extended handle-like bases 65 do not hang beyond the outer edges 7 of the terminal block 10 to clear for mounting of the housing 21.

While the invention has been described with reference to a specific embodiment, it is to be understood that various modifications thereto might be made without departing from the spirit and scope of the following claims.

I claim:

1. A jack assembly (20) for connecting to a telephone terminal block (10) having a plurality of screw terminals (11) with screw heads (12), where each screw terminal electrically connects to a predetermined one of a plurality of incoming telephone distribution wires (13), the jack assembly being of the type comprising:
- a housing (21) made of dielectric material;
- a jack (22) included in the housing, the jack having contact elements (27) for forming electrical connection with conductors from a station set or the like; and
- a plurality of leads (32) each having a first end (31) and a second end (33), the first end of the leads being electrically connected to respective contact elements (27) and the second ends being electrically connected to connectors (34) which effect electrical contact with the assigned screw terminals, characterized in that each connector comprises:
- a contact body (37), made of a conductive material, comprising:
  - a base (40); and
  - a plurality of resilient members (42), each with one end connected to the base and the other end being free-standing, the members at their free end portions (45) defining an opening (48) for snugly receiving its assigned screw head, where the free end portions can bear against the screw head to effect electrical connection.

2. The assembly pursuant to claim 1 where each end portion (45) further comprises a sharply edged contact point (47) for defining the opening (48).

3. The assembly pursuant to claim 2 where the contact points (47) are formed by the tips (47) of the end portions (45).

4. The assembly pursuant to claim 3 where the free end portions (45) tend toward one another with their tips (47) being most adjacent to define the opening (48).

5. A jack assembly (20) for connecting to a telephone terminal block (10) having a plurality of screw terminals (11) with screw heads (12), where each screw terminal electrically connects to a predetermined one of a plurality of incoming telephone distribution wires (13), the jack assembly being of the type comprising:
- a housing (21) made of dielectric material;
- a jack (22) included in the housing, the jack having contact elements (27) for forming electrical connection with conductors from a station set or the like; and
- a plurality of leads (32) each having a first (31) and second end (33), the first end of the leads being electrically connected to respective contact elements and the second ends being electrically connected to connectors (34) which effect electrical contact with the assigned screw terminals, characterized in that each connector comprises:
- a contact body (37) made of a conductive material comprising:
  - a first base (40); and
  - a plurality of resilient members (42), each with one end connected to the base and the other end being free-standing, the members at their free end portions (45) including sharp pointed contact tips (47), the free end portions (45) tending toward one another to define with the tips an opening (48) for snugly receiving its assigned screw head, where the tips can bear against the screw head to effect electrical connection.

6. The assembly pursuant to claim 5 where each contact (37) further comprises:
- means for electrically terminating (52) the second ends (33) of the leads (32) to the base (40).

7. The assembly pursuant to claim 5 where each connector (34) further comprises:
- a connector housing (62) made of dielectric material surrounding portions of the contact (37).

8. The assembly pursuant to claim 7 where the connector housing (62) is made of some particular colored dielectric material to correspond to the assigned color of its assigned screw terminal (11).

9. The assembly pursuant to claim 5 where each contact (37) comprises:

a first contact component (38) comprising:

the first base (40);

the plurality of resilient members (42), each member comprising:

an upright portion (44) extending substantially perpendicular to the base; and an end portion (45) which is bent inward toward the other members, each end portion including the sharp-pointed contact tip (47), whereby the base and the upright end portions of the members define a cavity (49) for receiving the screw head (12); and a second contact component (39) comprising:

a second base (51);

means for securing (54) the second base (51) to the base (40) of the first contact component (38); and a base portion (52) extended from the second base (51), the base portion (52) comprising crimping flanges (56, 58) for terminating a lead (32).

10. The assembly pursuant to claim 9 where the first base (40) comprises a hole (41) and the second base (51) comprises a sleeve (54) which fits through the hole (41); whereby the sleeve is expanded to form a rivet-type edge (55) after being fitted through hole (41) to secure the second base to the first base.

11. The assembly pursuant to claim 9 where each connector (34) further comprises:

a connector housing (62) made of dielectric material surrounding portions of the contact body (37).

12. The assembly pursuant to claim 9 where the first component and second component bases (40, 51) each comprises a hole (41) and an aperture (53) respectively, and where the connector housing (62) comprises:

a circular base (63) with a substantially circular wall (64) extending perpendicularly therefrom and a stud (68) in its center; and an elongate handle-like base portion (65) extending from the circular base, the handle-like base portion having extended perpendicularly therefrom along its longitudinal edges 67, side walls (66);

whereby the walls (64, 66) define a recess (69, 70) for receiving the contact body (37) with the stud (68) fitting through the contact body hole (41) and aperture (53);

and whereby the walls and stud can be deformed so that the side walls enclose the crimped flanges (56, 58) and the stud expands to interlock the connector housing (62) to the contact component bases (40, 51).

* * * * *